June 20, 1950
C. A. BICKEL
2,512,008
APPARATUS FOR OPERATING LATHES
Original Filed March 21, 1941
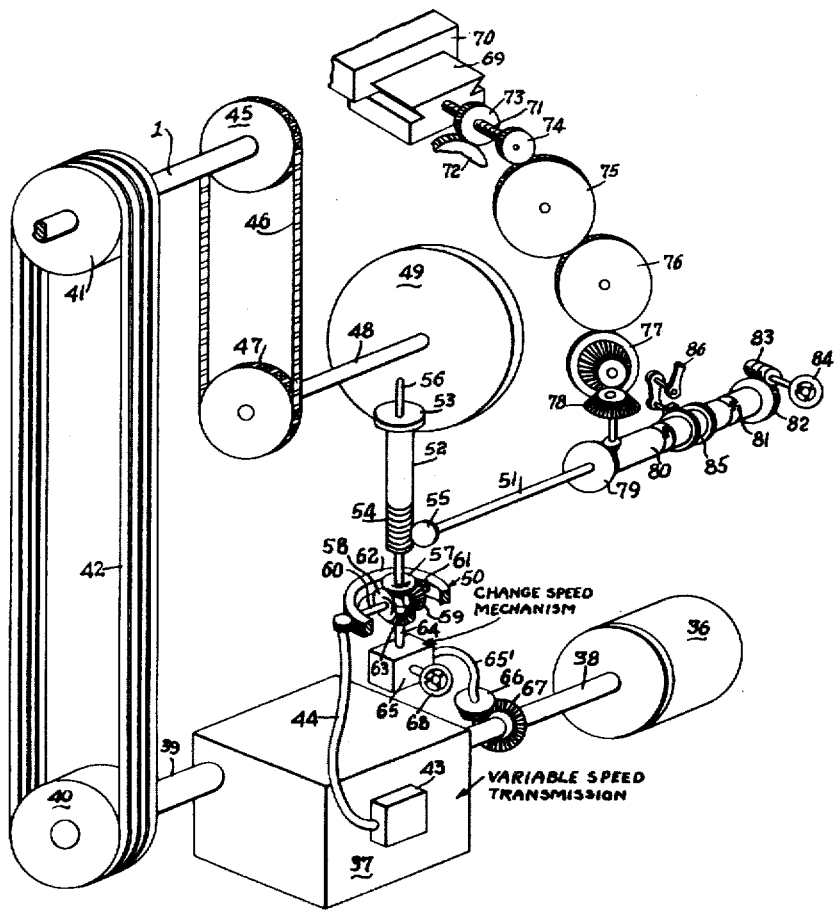
INVENTOR
CLIFFORD A. BICKEL
By Toulmin & Toulmin
ATTORNEYS Patented June 20, 1950

2,512,008

UNITED STATES PATENT OFFICE 2,512,008

APPARATUS FOR OPERATING LATHES

Clifford A. Bickel, Sidney, Ohio, assignor to The Monarch Machine Tool Co., Sidney, Ohio, a corporation of Ohio Original application March 21, 1941, Serial No. 384,507, now Patent No. 2,389,757, dated November 27, 1945. Divided and this application January 22, 1945, Serial No. 573,991

8 Claims. (Cl. 82—2)

This invention relates to lathes, and particularly to means for maintaining constant the surface cutting speeds required for any particular material, type or kind of cutting tool. While high speed cutting tools are capable of rapid work, care must be taken not to exceed certain well-defined linear or surface cutting speeds, while said speeds should be maintained above a certain minimum in order to maintain production and quality of work. Therefore, it is highly desirable to maintain the linear or surface cutting speed of each particular job, within close or well-defined limits; and where the work is of varying radii, the spindle speed must be varied inversely as the instantaneous radius of the workpiece, that is, the distance of the cutting edge of the tool from the spindle axis at that particular time.

It is an object of my invention to effect the previously described function in an efficient manner whereby the surface cutting speed may be pre-selected and maintained substantially constant throughout the cutting operation.

Another object is to provide a lathe wherein the variations in spindle speed necessary to maintain constant linear surface cutting speed are automatically effected by the means controlling the radial position or distance of the cutting edge of the tool from the axis of rotation of the work.

A further object is to effect the aforementioned control by directly varying the speed of the motor driving the work.

A still further object is to provide a device for comparing two speeds, one proportional to the desired instantaneous surface cutting speed and another proportional to the actual surface cutting speed, together with mechanism controlled by the difference in said speeds to maintain the actual surface cutting speed at the desired value at all times.

Other objects and advantages of my invention will become apparent as the description proceeds.

In the drawing:

The figure of the drawing is a diagrammatical view showing a constant surface cutting speed control wherein one speed proportional to the instantaneous surface cutting speed is compared with a speed proportional to the desired cutting speed and any difference between the two speeds is used to vary the actual surface cutting speed to maintain the latter constant.

The single figure of the drawing of my invention shows apparatus which functionally is similar to that of Figure 1 of my parent application, Patent No. 2,389,757, issued Nov. 27, 1945, of which this application is a division.

In my invention a differential is used to compare the speeds of a shaft driven by the lathe motor with another shaft driven proportionately to the instantaneous surface cutting speed of the lathe.

In this arrangement the motor 36 provides the power for driving the variable speed transmission 37 by means of a motor shaft 38. The output shaft 39 of the variable speed transmission has fixed thereto the pulley 40, while the pulley 41 is fixed to spindle 1. Belts 42 connect pulleys 40 and 41 to drive the spindle at a speed determined by the adjustment of variable speed transmission 37. The variable speed transmission in this species has a controlled output speed range over the entire range of speed desired for spindle 1. Such a transmission may be of the infinitely variable type similar to that shown at Figure 1 of the parent application and may be operated either mechanically, hydraulically or electrically. This transmission 37 is provided with a control mechanism 43 which, when operated by means of a flexible shaft 44, varies the output speed of shaft 39 in proportion to the adjustment of said control mechanism. This control mechanism 43 is of conventional type well-known in the art. The spindle 1 of the lathe carries a sprocket 45 which meshes with and drives a chain 46. The chain 46 passes over the drives a sprocket 47 fixed upon a shaft 48 journaled in a headstock of the lathe. Shaft 48 carries a friction wheel 49 which is of a diameter proportional to the largest diameter of work capable of being swung by the lathe. It is thus seen that the disc 49 will be rotated at the same speed or at a speed directly proportional to spindle 1. A differential control mechanism indicated generally by numeral 50 is associated with disc 49 and a control rod 51, the motor 36 and the variable speed drive 37 to alter the speed of output shaft 39 in accordance with the instantaneous diameter of the work being turned.

This control mechanism consists of a rotatable cylinder 52 having a friction wheel 53 fixed therewith and positioned to frictionally engage and be driven by wheel 49. The opposite end of cylinder 52 is formed with a circular rack 54 meshing and driven by a gear 55 secured to one end of control rod 51. The friction disc 53 is arranged to be in continuous engagement with the wheel 49 and is movable radially thereover for the purpose subsequently to be described.

The cylinder 52 is splined to shaft 56 so as to rotate the shaft while being reciprocable thereupon. The lower end of shaft 56 carries a bevel gear 57 forming one side of differential 56 and which in turn meshes with a pair of planetary bevel gears 58 and 59. These bevel gears are carried upon shafts 60 and 61 which are mounted in a planetary ring gear 62. A bevel gear 63 forming another side of said differential also meshes with planetary gears 58 and 59. This gear 63 is carried upon shaft 64 extending from change speed mechanism 65 and comprises the output shaft of said mechanism, while the input shaft 65¹ thereof has a bevel gear 66 connected thereto in mesh with a bevel gear 67 fixed to the shaft 38 of motor 36. Change speed mechanism 65 is provided with a control wheel 68 extending therefrom and arranged for manual operation. This change speed mechanism is similar in operation to the variable transmission 22 of Figure 1 of said parent application, but is smaller in size since it is not included in the spindle driving mechanism, and therefore, is not required to transmit power between the motor 36 and the spindle 1. A lathe carriage 69 carries a conventional cross slide 70 adapted to be operated by rotation of cross feed screw 71 driven in a conventional manner by gears 72 and 73. A gear 74 is attached to cross feed screw 71 and drives a chain of gearing 75, 76 and 77. Gear 77 has a bevel gear connected therewith which in turn meshes with a bevel gear 78 connected to drive gear 79 integral with a sleeve 80 journaled on control rod 51.

As in the parent case, a sleeve 81 having a worm wheel 82 fixed thereto is journaled upon control rod 51 and is adapted to be rotated by means of a worm 83 and a handwheel 84 connected thereto. Sleeves 80 and 81 are in spaced relationship along rod 51 and have facing clutch teeth adapted to be selectively engaged by corresponding clutch teeth formed on the end of an intermediate sleeve 85 splined to rod 51 and located between sleeves 80 and 81.

The control lever 86 is provided on the carriage apron and is connected to axially move sleeve 85 whereby said sleeve may be brought into operative engagement with sleeve 80 or sleeve 81. When sleeve 85 is in engagement with sleeve 80, automatic operation of rod 51 is provided whereby sleeve 52 is moved axially to shift disc 53 radially over wheel 49 by and in proportion to the position of cross slide 70 with respect to the axis of spindle 1. When sleeve 85 is in engagement with sleeve 81 manual control over the spindle speed is afforded. At this time variations in the speed of spindle 1 may be affected by the rotation of hand wheel 84 as will be obvious from inspection of the drawing.

It will be understood that motor 36 operates to drive spindle 1 through variable speed transmission 37. This motor is a constant speed type and, therefore, its shaft will operate to rotate shaft 65¹ forming an input of change speed mechanism 65 at constant speed. Likewise, for each setting of handwheel 68 of change speed mechanism 65, output shaft 64 and its attached gear 63 will also operate at constant speed. Since the friction disc 53 is rotated by wheel 49, the gear 57 will be rotated at a definite speed for each setting of disc 53 radially with respect to wheel 49.

The differential 56, therefore, provides a mechanism whereby ring gear 62 will be rotated whenever there is a difference in the speeds of rotation of shafts 56 and 64 to thereby drive shaft 44 and effect the necessary adjustment of control 43 of variable speed transmission 37.

Stated in another way, the differential 56 compares the speeds of shafts 56 and 64. If these speeds are equal and opposite, no rotation of planetary ring gear 62 and no adjustment of control mechanism 43 are effected. However, for example, as the cross slide 70 moves toward the work axis of rotation so that an increased spindle speed is necessary to maintain constant surface cutting speeds, disc 53 is correspondingly moved radially inwardly over wheel 49 through the drive to control rod 51 previously described.

This movement results in a reduced rate of rotation for shaft 56 and as the two speeds of shafts 56 and 64 are now unequal a rotation of ring gear 62 results at a rate proportional to the difference in rates of rotation of said shaft. Shaft 44 is thereby driven to adjust control mechanism 43 to thereby increase the rate of rotation of output shaft 39 relative to the input or constant speed shaft of motor 36. As a result of the increase in speed of shaft 39, spindle 1 on wheel 49 is rotated at a faster rate. This increase in rate continues until shaft 56 is again being driven at the same speed as shaft 64 whereupon rotation of ring gear 62 ceases. It will be understood that the action just described is smooth and continuous as the cutting radius of the tool varies so that the spindle speed is, in the example given, progressively increased in a stepless manner to at all times maintain constant the surface cutting speed.

To obtain constant surface cutting speed with this mechanism the cutting tool carried by the cross slide 70 is positioned adjacent the workpiece at the largest diameter that is to be turned.

Lever 86 is operated to bring sleeve 81 and 85 into engagement and handwheel 84 is then rotated to position disc 53 radially from the center of rotation of wheel 49, a distance proportional to the radial distance of the cutting edge of the tool from the axis of rotation of spindle 1. The radial position of disc 53 with respect to the center of wheel 49 may be indicated at a suitable work diameter dial associated therewith. Lever 86 is then moved to bring sleeve 85 into engagement with sleeve 80 whereupon the drive between cross feed screw 71 and control rod 51 is effected to automatically control changes in the radial position of disc 53. Thus, the speed of rotation of disc 53 directly reflects the surface speed of the work being cut at any instance.

In order to alter surface cutting speed in increments, as for example, from 100 to 200 feet per minute the change speed mechanism 65 is provided to alter the speed of rotation of gear 63 with respect to that of input shaft 66. This change speed mechanism is arranged with a plurality of intermeshing gears similar to the mechanism 22 employed in connection with the apparatus of Figure 1 of my parent application. If desired, a gear ratio dial may be associated with handwheel 68 to indicate the surface speed as in feet per minute obtained by the intermeshing of the respective gears provided therein. Thus, by doubling the speed of rotation of gear 63 ring gear 62 will be operated in the direction necessary to increase the output speed of transmission 37 whereby rotation of wheel 49 and disc 53 is increased to match and equal the increased speed of rotation of gear 63. It is thus seen that the species just described is directly responsive to the surface cutting speed of the work so that said speed is maintained constant throughout the entire radial movement of the cutting tool with respect to the axis of rotation of a lathe spindle. It will also be seen that the surface cutting speed can be regulated merely by altering the speed ratio between the output shaft 64 of the change speed mechanism 65 and the constant speed of the driving shaft 38.

While the mechanism herein described discloses a preferred form of the apparatus, it will be understood that the device is susceptible to numerous changes and substitutions of equivalents. I, therefore, desire to reserve all such changes and substitutions as fall within the scope of the subjoined claims.

Having now described the invention, what I claim and desire to secure by Letters Patent is:

1. In combination with a lathe having a work spindle rotatable on a fixed axis, a toolholder movable toward and from said axis, a motor, a driving connection from said motor to said spindle, and including a variable speed transmission, a wheel connected to said spindle and rotated in timed relation therewith, a friction disc movable radially of said wheel and in driven contact therewith, a shaft splined to said disc, a second shaft connected to said motor and driven in timed relation therewith, joint means driven jointly by said shafts and connected to said transmission to operate same, and means movable with said holder for radially moving said disc.

2. In a lathe having a work spindle rotatable on an axis, a carriage, a toolholder on said carriage, means moving said holder toward and from said axis, a friction wheel connected to said spindle and rotated at a speed proportional thereto, a friction disc movable radially of and in contact with said wheel, means selectively operable to move said disc manually, or from said holder in accordance with the distance thereof from said axis, a source of power, a connection between said source and spindle including a variable speed transmission having variable speed control means, a differential, means driving one side of said differential from said disc, means driving another side of said differential from said power source, and means driven by the third side of said differential to actuate said variable speed control means for varying the speed of said transmission.

3. In a lathe, a work spindle rotatable about a fixed axis, a power drive connected to rotate said spindle, said power drive including a variable speed transmission having variable speed control means, a cross slide, means mounting said slide for movement toward said axis, a variable speed drive connected to and operated by said spindle, means movable with said slide for adjusting the output speed of said drive in accordance with the position of said slide with respect to said axis, a differential having two sides respectively connected to and driven by said variable speed drive and said power drive, and a connection between the third side of said differential and said variable speed control means of the transmission to vary the speed of said spindle in accordance with the output speed of said differential.

4. In a lathe, a work spindle rotatable on a fixed axis, a power source, a drive from said source to said spindle, including a variable speed transmission, a cross slide mounted for movement toward said axis whereby a tool on said slide may operate upon a workpiece rotated by said spindle, a variable speed drive having input and output elements, said input element being connected to said spindle and driven at a speed proportional to the speed of said spindle, a connection adjusting said drive from said slide, whereby the output element thereof is driven at a speed proportional to the position of said slide relatively to said axis, a differential having one side driven by the output of said variable speed drive, a connection from said power source driving another side of said differential, said connection including a change speed mechanism, and a driving connection from the third side of said differential to said variable speed transmission.

5. In a lathe, a work spindle rotatable upon an axis, a power source, a drive from said source to said spindle, including a variable speed transmission, a cross slide mounted for movement toward and from said axis, said slide being adapted to carry a cutting tool for operation upon a workpiece carried by said spindle, a disc connected to said spindle and rotated at a speed directly proportional to said spindle, a friction wheel movable radially over said disc and rotated thereby, a connection between said slide and wheel whereby the radial position of the wheel is proportional to the position of said slide with respect to the spindle axis, a differential, means connecting one side of said differential to said wheel and driving said one side at a speed proportional to said wheel, means connected to said power source for driving a second side of said differential at a speed proportional to that of said power source, and including a manually-operable change speed mechanism, and connection between means the third side of said differential and said variable speed transmission.

6. In a lathe, a work spindle rotatable upon an axis, a tool slide movable toward and from said axis, a motor, a driving connection from said motor to said spindle, including a variable speed transmission having variable speed control means, first means connected to said motor and driven at a speed proportional to the speed of said motor, second means including adjustable speed control means connected to said spindle and driven at a speed proportional to the speed of said spindle, connection means movable with the tool slide and connected to the adjustable speed control means for adjusting the output speed of said second means in accordance with the position of said tool slide with respect to said axis, joint means driven jointly by said first and said second means to compare said speeds, and interconnecting means movable with the said joint means and connected to said variable speed control means for controlling the output speed of said variable speed transmission.

7. In a lathe, a spindle, a motor, driving connections from said motor to rotate said spindle on an axis, said connections including a variable speed transmission having variable speed control means, a tool slide movable toward and from said axis, a differential, first drive means connected to the motor for driving one side of said differential proportional to the speed of said motor, second drive means including adjustable speed means connected to the spindle for driving another side of said differential proportional to the speed of said spindle, connection means movable with the tool slide and connected to the adjustable speed control means for adjusting the output speed of said second drive means in accordance with the position of said tool slide with respect to said axis, and means operated by the third side of said differential and connected to said variable speed control means to control said transmission.

8. In a lathe, a spindle, a motor, driving connections from said motor to rotate said spindle on an axis, said connections including a variable speed transmission having variable speed control means, a tool slide movable toward and from said axis, a differential, first drive means, said first drive means including a change speed mechanism connected to the motor for driving one side of said differential proportional to the speed of said motor, second drive means including adjustable speed control means connected to the spindle for driving another side of said differential proportional to the speed of said spindle, connection means movable with the tool slide and connected to the adjustable speed control means for adjusting the output speed of said second drive means in accordance with the position of said tool slide with respect to said axis, and means operated by the third side of said differential and connected to said variable speed control means to control said transmission.

CLIFFORD A. BICKEL.

REFERENCES CITED

The following references are of record in the file of this patent:

UNITED STATES PATENTS

| Number | Name | Date |
| --- | --- | --- |
| 585,712 | Smith | July 6, 1897 |
| 798,391 | Clark | Aug. 29, 1905 |
| 1,100,747 | Krauss | June 23, 1914 |
| 1,227,822 | Oliver | May 29, 1917 |
| 2,080,145 | Maurer | May 11, 1937 |
| 2,127,023 | Falk | Aug. 16, 1938 |
| 2,255,739 | Curtis | Sept. 9, 1941 |
| 2,271,598 | Maurer | Feb. 3, 1942 |
| 2,389,757 | Bickel | Nov. 27, 1945 |